(12) United States Patent
Fetterman et al.

(10) Patent No.: US 10,641,888 B2
(45) Date of Patent: May 5, 2020

(54) CUED AUTOMOBILE SENSOR FUSION

(71) Applicant: VEONEER US, INC., Southfield, MI (US)

(72) Inventors: Matthew Fetterman, Waltham, MA (US); Aret Carlsen, Groton, MA (US)

(73) Assignee: Veoneer US Inc., Southfield, MI (US)

( * ) Notice: Subject to any disclaimer, the term of this patent is extended or adjusted under 35 U.S.C. 154(b) by 169 days.

(21) Appl. No.: 15/804,821

(22) Filed: Nov. 6, 2017

(65) Prior Publication Data

US 2019/0137619 A1 May 9, 2019

(51) Int. Cl.
| | |
|---|---|
| *G01S 13/86* | (2006.01) |
| *G06K 9/00* | (2006.01) |
| *G01S 13/931* | (2020.01) |
| *G01S 13/66* | (2006.01) |

(52) U.S. Cl.
CPC .......... *G01S 13/867* (2013.01); *G01S 13/931* (2013.01); *G06K 9/00805* (2013.01); *G01S 13/66* (2013.01); *G01S 2013/93271* (2020.01)

(58) Field of Classification Search
None
See application file for complete search history.

(56) References Cited

U.S. PATENT DOCUMENTS

| | | |
|---|---|---|
| 8,199,046 B2 | 6/2012 | Nanami |
| 8,416,123 B1 | 4/2013 | Mitchell et al. |
| 9,429,650 B2 | 8/2016 | Zeng et al. |
| 9,599,706 B2 | 3/2017 | Zeng et al. |
| 10,114,117 B2 * | 10/2018 | Salmen .................... G01S 17/89 |
| 2004/0213589 A1 | 10/2004 | Barbera et al. |
| 2005/0185824 A1 | 8/2005 | Chen |
| 2009/0251355 A1 | 10/2009 | Nanami |
| 2011/0163904 A1 | 7/2011 | Alland et al. |
| 2015/0217765 A1 | 8/2015 | Tokoro |
| 2016/0203374 A1 | 7/2016 | Zeng et al. |
| 2017/0038466 A1 * | 2/2017 | Salmen .................... G01S 17/89 |
| 2017/0097413 A1 | 4/2017 | Gillian et al. |
| 2018/0232947 A1 * | 8/2018 | Nehmadi ................ G06T 17/05 |
| 2018/0367871 A1 * | 12/2018 | Zeng ....................... G01S 13/86 |
| 2019/0113624 A1 * | 4/2019 | Robinson .............. G01S 7/2922 |

FOREIGN PATENT DOCUMENTS

WO 2005024463 3/2005

OTHER PUBLICATIONS

WO2005024463A1—Translation (7 pgs), Mar. 5, 2005.
Jan. 28, 2019 PCT/US2018/059289 International Search Report (2 pgs).
Jan. 28, 2019 PCT/US2018/059289 Written Opinion (11pgs).

* cited by examiner

*Primary Examiner* — Bernard Krasnic
(74) *Attorney, Agent, or Firm* — Matthew D. Thayne; Thayne and Davis LLC

(57) ABSTRACT

Methods and systems for remote detection of objects involving cued sensor fusion. In some implementations, a first set of sensed data may be generated using a first object sensor and a second set of sensed data generated using a second object sensor. An object may then be detected using the sensed data from the first object sensor. Upon detecting the object using the sensed data from the first object sensor, a setting associated with the second object sensor may be changed to increase the probability of detecting the object using the second set of sensed data from the second object sensor.

13 Claims, 4 Drawing Sheets

CUED AUTOMOBILE SENSOR FUSION

SUMMARY

Object-level fusion is commonly used in connection with sensor systems for detecting remote objects from a host vehicle. With this type of architecture, data from a first sensor may be combined with data from a second sensor to provide more information for identifying and tracking an object. This type of architecture also may allow for combining sensors as "black boxes." In other words, rather than detection-level fusion, which may require extensive tuning and adjustment of detection and/or tracking modules for each possible sensor combination, sensors may be combined and used together essentially in a plug-and-play type architecture. However, if one sensor fails to identify the target, this object-level fusion will fail. In other words, with typical object-level fusion, if one sensor fails to identify an object identified by the other sensor, the fusion tracker or fusion tracking module of the system has no data from one sensor to combine and use in tracking the object.

The present inventors have therefore determined that it would be desirable to provide systems and methods that overcome one or more of the foregoing limitations and/or other limitations of the prior art. Thus, in some embodiments, the inventive concepts disclosed herein may be used to provide a cued fusion architecture, which for purposes of this disclosure may be considered a modified object-level fusion architecture. In some embodiments, a cue from a first sensor may be used to trigger one or more settings or parameter changes, such as running in a special mode, to the second sensor to increase the probability of detection by the second sensor.

For example, in some embodiments, one or more thresholds, such as a detection threshold and/or a tracker threshold, for the second sensor may be lowered in response to an object being detected by the first sensor. This change may be temporarily and/or may only be in a direction or general direction (within an angle range, for example) of the object detected by the first sensor. Thus, the special operation mode may lower detection thresholds and/or require fewer consistent detections to maintain a track. Preferably, this does not require any physical rotation of the second sensor. This may provide for increasing the probability of detection of the object by the second sensor without increasing the probability of false alarms/detections by the second sensor. For example, in embodiments in which the special mode is operational only within a relatively short period of time and/or within a relatively small region of space (corresponding with the object detected by the first sensor), overall false positive rates should stay constant, or may only slightly increase within the relatively small time and/or angle window and therefore provide for a negligible overall false positive rate increase, while increasing the true positive rate for the targets of interest.

Advantageously, some embodiments may be configured to preserve the black-box advantage of object-level sensor fusion. In other words, sensors may be combined together without requiring extensive, customized tuning/adjustment. In some embodiments, the sensor may be combined together in a plug-and-play fashion without requiring any such customization.

In a more particular example of a method for detecting objects within a host vehicle according to some implementations, the method may comprise generating, receiving, and/or transmitting a first set of sensed data using a first object sensor, such as a RADAR sensor, a visual sensor/ camera, a LIDAR sensor, or the like. The method may further comprise generating, receiving, and/or transmitting a second set of sensed data using a second object sensor. In preferred embodiments and implementations, the first object sensor may differ from the second object sensor to allow for combining advantageous aspects of different sensor technologies. An object or suspected object may then be detected using the sensed data from the first object sensor. Upon detecting the object using the sensed data from the first object sensor, a setting associated with the second object sensor may be changed to place the second object sensor in a special mode to increase the probability of detecting the object using the second set of sensed data from the second object sensor.

In some implementations, the step of changing a setting associated with the second object sensor to increase the probability of detecting the object using the second set of sensed data from the second object sensor may comprise changing a threshold of the second object sensor, such as lowering the threshold of the second object sensor. In some such implementations, the step of changing a setting associated with the second object sensor to increase the probability of detecting the object using the second set of sensed data from the second object sensor may comprise changing at least one of a detection threshold of a detection module and a tracking threshold of a tracker or tracking module of a remote object detection and/or tracking system. In some such implementations, the step of changing a setting associated with the second object sensor to increase the probability of detecting the object using the second set of sensed data from the second object sensor may comprise changing at least one of a signal-to-noise ratio of the detection module and a threshold of the tracking module for initiating or maintaining a track of an object detected by the detection module.

Some implementations may further comprise, upon detecting an object using the sensed data from the second object sensor, changing a setting associated with the first object sensor to increase the probability of detecting the object using the first set of sensed data from the first object sensor.

In an example of a system for remote detection of objects from within a host vehicle according to some embodiments, the system may comprise a first object sensor configured to receive a first set of sensed data and a second object sensor configured to receive a second set of sensed data. As previously mentioned, preferably the object sensors are of different types. In addition, it should be understood that more than two such object sensors may be used in some embodiments or in any of the methods/implementations disclosed herein. The system may further comprise an object detection module configured to receive data from the first object sensor. The object detection module may be configured to use the data from the first object sensor and/or the second object sensor to identify remote objects from within the host vehicle and to, upon detection of an object by the object detection module using the first set of sensed data from the first object sensor, change a setting associated with the second object sensor to increase the probability of the object detection module detecting the object using data from the second object sensor.

In some embodiments, the object detection module may be part of a first sensor module that includes the first object sensor. In some such embodiments, the first sensor module may further comprise a first tracking module configured to receive processed data from the object detection module to track remote objects identified by the object detection module.

Some embodiments may further comprise a second sensor module. The second object sensor may be part of the second sensor module. The second sensor module may further comprise a second object detection module configured to receive data from the second object sensor. The second object detection module may be configured to use the data from the second object sensor to identify remote objects from within the host vehicle. In some embodiments, the second sensor module may further comprise a second tracking module configured to receive processed data from the second object detection module to track remote objects identified by the second object detection module.

Some embodiments may further comprise a fusion tracking module configured to receive data from both the first tracking module and the second tracking module to track objects detected by both the first tracking module and the second tracking module.

In some embodiments, the system may be configured to, upon detection of an object by the object detection module using the first set of sensed data from the first object sensor, reduce at least one of a detection threshold and a tracker threshold associated with the second object sensor to increase the probability of the object being detected using data from the second object sensor. Similarly, some embodiments may be configured to, upon detection of an object by the object detection module using the second set of sensed data from the second object sensor, reduce at least one of a detection threshold and a tracker threshold associated with the first object sensor to increase the probability of the object being detected using data from the first object sensor.

In some embodiments, the system may be configured to, upon detection of an object by the object detection module using the first set of sensed data from the first object sensor, reduce at least one of a detection threshold and a tracker threshold associated with the second object sensor only within an angle range associated with the detected object.

In another example of a system for remote detection of objects from within a host vehicle, the system may comprise a first object sensor configured to receive a first set of sensed data and a second object sensor configured to receive a second set of sensed data. Again, the first object sensor may comprise an object sensor of a different type than the second object sensor. Thus, in some embodiments, the first object sensor may comprise a camera and the second object sensor may comprise a RADAR sensor.

The system may further comprise a first object detection module configured to receive raw data from the first object sensor. The first object detection module may be configured to attempt to identify remote objects using the raw data from the first object sensor. The system may further comprise a second object detection module configured to receive raw data from the second object sensor. The second object detection module may be configured to attempt to identify remote objects using the raw data from the second object sensor.

The system may further comprise a first tracking module configured to receive processed data from the first object detection module to track remote objects identified by the first object detection module and a second tracking module configured to receive processed data from the second object detection module to track remote objects identified by the second object detection module.

The system may further comprise a fusion tracking module configured to receive data from both the first tracking module and the second tracking module to combine data originating from the two object sensors and track objects detected by both the first tracking module and the second tracking module.

The system for remote detection may be configured to, upon confirmation of a detection of an object by at least one of the first object detection module and the first tracking module, reduce at least one of a detection threshold of the second object detection module and a tracker threshold of the second tracking module to increase the probability of the object being detected using data from the second object sensor.

In some embodiments, the system may be further configured to, upon confirmation of a detection of an object by at least one of the first object detection module and the first tracking module, reduce at least one of a detection threshold and a tracker threshold associated with the RADAR sensor to increase the probability of the object being detected using data from the RADAR sensor.

In some embodiments, the system for remote detection may be configured to, upon detection of an object by at least one of the first object detection module and the first tracking module, reduce at least one of a detection threshold and a tracker threshold associated with the RADAR sensor only within a region associated with the object detected by the camera/first sensor, such as at an angle or within an angle range associated with the object detected by the camera.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
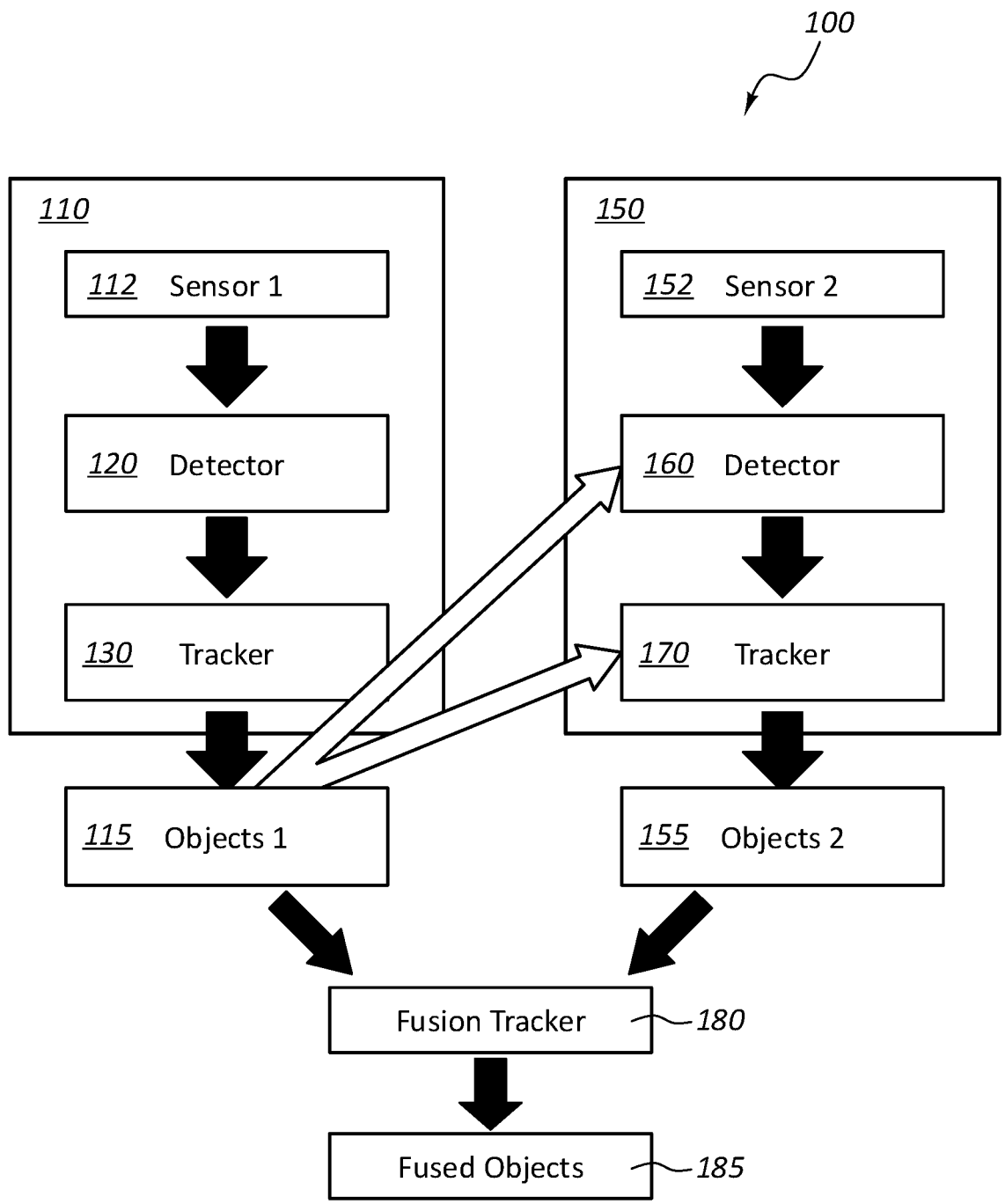
FIG. 1 is a schematic diagram depicting an example of a system for remote detection of objects from within a host vehicle according to some embodiments.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to new methods and systems for combining sensor data in remote object detection. In some embodiments, the inventive principles disclosed herein may be used to allow for combining two or more sensors together in a manner such that each sensor is a black box and doesn't require extensive modification/customization in order to fuse their data. This may be accomplished by using a trigger from one sensor to cue a change in an operational mode of one or more other sensors. Thus, for example, a RADAR sensor detecting an object may be used as a trigger to temporarily change the operational mode of a camera in order to increase the probability that the camera will also detect the object. Similarly, a camera or other sensor, in some embodiments, detecting an object may be used as a trigger to temporarily change the operational mode of a RADAR sensor or other second sensor in order to increase the probability that the RADAR sensor or other second sensor will also detect the object. The probability of one sensor missing an object may thereby be reduced as compared to conventional object-level fusion.

As a more specific example of an embodiment in which a visible sensor/camera may cue a RADAR sensor, in some systems, a camera may take about six frames to declare a target. However, the system may be configured such that the camera could declare a target after less frames (in some cases, after a single frame, for example), but with a lower quality factor. Thus, some systems according to certain embodiments utilizing the principles disclosed herein may be configured to use a lower quality factor threshold to cue the RADAR sensor. By the time the RADAR sensor has formed a track, the camera may have improved the quality factor of its track. The fusion tracking module may then be configured to ignore the lower-quality initial object data from the camera until such time as a higher-quality track is obtained from the camera. In this manner, the remote object detection system may be configured to utilize a lower detection threshold with the camera or another first sensor and more quickly cue the RADAR sensor to the detected object using a special operational mode. This may allow for the development of more certainty about a potential object/target before confirming a track and/or sending data to a fusion tracker or tracking module.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts a schematic diagram of a system 100 for remote detection of objects from within a host vehicle. As depicted in this figure, system 100 comprises a first object sensor module 110 comprising a first sensor 112. First object sensor module 110 further comprises a first object detection sub-module 120 configured to receive a first set of raw, sensed data from first sensor 112. First object sensor module 110 further comprises a first tracking sub-module 130 configured to receive processed data from the first object detection module 120 to track remote objects identified by the first object detection module 120 using the raw data from the first sensor 112.

Similarly, system 100 comprises a second object sensor module 150 comprising a second sensor 152. Second object sensor module 150 further comprises a second object detection sub-module 160 configured to receive a second set of raw, sensed data from second sensor 152. Second object sensor module 150 further comprises a second tracking sub-module 170 configured to receive processed data from the second object sensor module 150 to track remote objects identified by the second object sensor module 150 using the raw data from the second sensor 152.

One or both of object sensor modules 110 and 150 may be configured to detect and/or track one or more sets of data representative of identified objects, such as objects 115 and 155, respectively. These objects from modules 110 and 150 may then be combined using a fusion tracking module 180, which may be configured to receive data from both the first tracking module 130, or otherwise from first object sensor module 110, and the second tracking module 170, or otherwise from the second object sensor module 150, to track one or more objects detected by both the first sensor module 110 and the second sensor module 150. Fusion tracking module 180 may then be configured to fuse these tracked objects and process the combined data to arrive at one or more fused objects 185. Thus, system 100 is an example of a modified version of an object-level fusion system.

Unlike known object-level fusion systems, however, system 100 is configured to alter an operational parameter of one of sensor modules 110 and 150 in response to the other of sensor modules 110 and 150 identifying an object. Thus, as indicated by the arrows in FIG. 1, upon detecting an object 115 by first sensor module 110, system 100 may be configured to change one or more operational parameters of second sensor module 150, such as one or both of detection module 160 and tracking module 170.

Thus, in some embodiments, system 100 may be configured to reduce a detection threshold of the second detection module 160 and a tracker threshold of the second tracking module 170 to increase the probability of the object detected by sensor 112 and/or sensor module 110 being detected using data from the second object sensor 152 and/or second sensor module 150.

To provide a more specific example, in some embodiments, sensors 112 and 152 may differ from one another. For example, sensor 112 may comprise a camera and sensor 152 may comprise a RADAR sensor. In some such embodiments, system 100 may be configured to, upon confirmation of a detection of an object by camera 112 and/or module 110, reduce at least one of a detection threshold and a tracker threshold associated with the RADAR sensor 152 and/or module 150 to increase the probability of the object detected by the camera 112 also being detected using data from the RADAR sensor 152.

Thus, as a more specific example, if the detection module is configured to apply a detection threshold in terms of signal-to-noise ratio ("SNR") for establishing an object detection, this SNR threshold may be temporarily decreased following the detection of an object by the detection module of the other sensor. Similarly, in some embodiments, either as an alternative to or in addition to applying a detection threshold reduction, a tracking threshold reduction may be applied. Thus, for example, if the tracking module is configured to apply a threshold for establishing a track in terms of detecting the object in 4 consecutive cycles (a 4/4 tracker), this threshold may be temporarily reduced, such as to a 3/3 tracker. In some embodiments, this change/changes may be temporary and may involve additional thresholds, such as time thresholds. Such thresholds may vary as needed in accordance with the desired error rate of the system.

In some embodiments, both sensor modules 110/150 may be configured to change the settings of the other module/sensor upon detecting an object. Thus, with respect to the embodiment depicted in FIG. 1, module 150 may also, or alternatively, be configured to change one or more operational parameters of module 110 upon detecting an object to increase the likelihood of module 110 detecting and/or tracking the same object.

In some embodiments, one or both of sensor modules 110/150 may be configured to apply a setting change to the other module that may apply only at a particular angle or within a particular angle range. Thus, for example, if a camera detects an object at an angle of thirty degrees relative to the host vehicle in a given direction, a RADAR sensor may be configured to reduce a detection threshold at this angle, or within a desired range of this angle, for a predetermined amount of time. For example, if the detection threshold is 18 dB SNR, this threshold may be reduced to 15 dB SNR at or about thirty degrees for 100 ms. In addition, or alternatively, the RADAR may reduce a tracking threshold. Thus, for example, the tracking threshold may be reduced from 4/4 to 3/3 temporarily. In some embodiments, the setting(s) of the non-detecting sensor/module may only be adjusted at an angle or within an angle range associated with the detected object.

Figure 2:
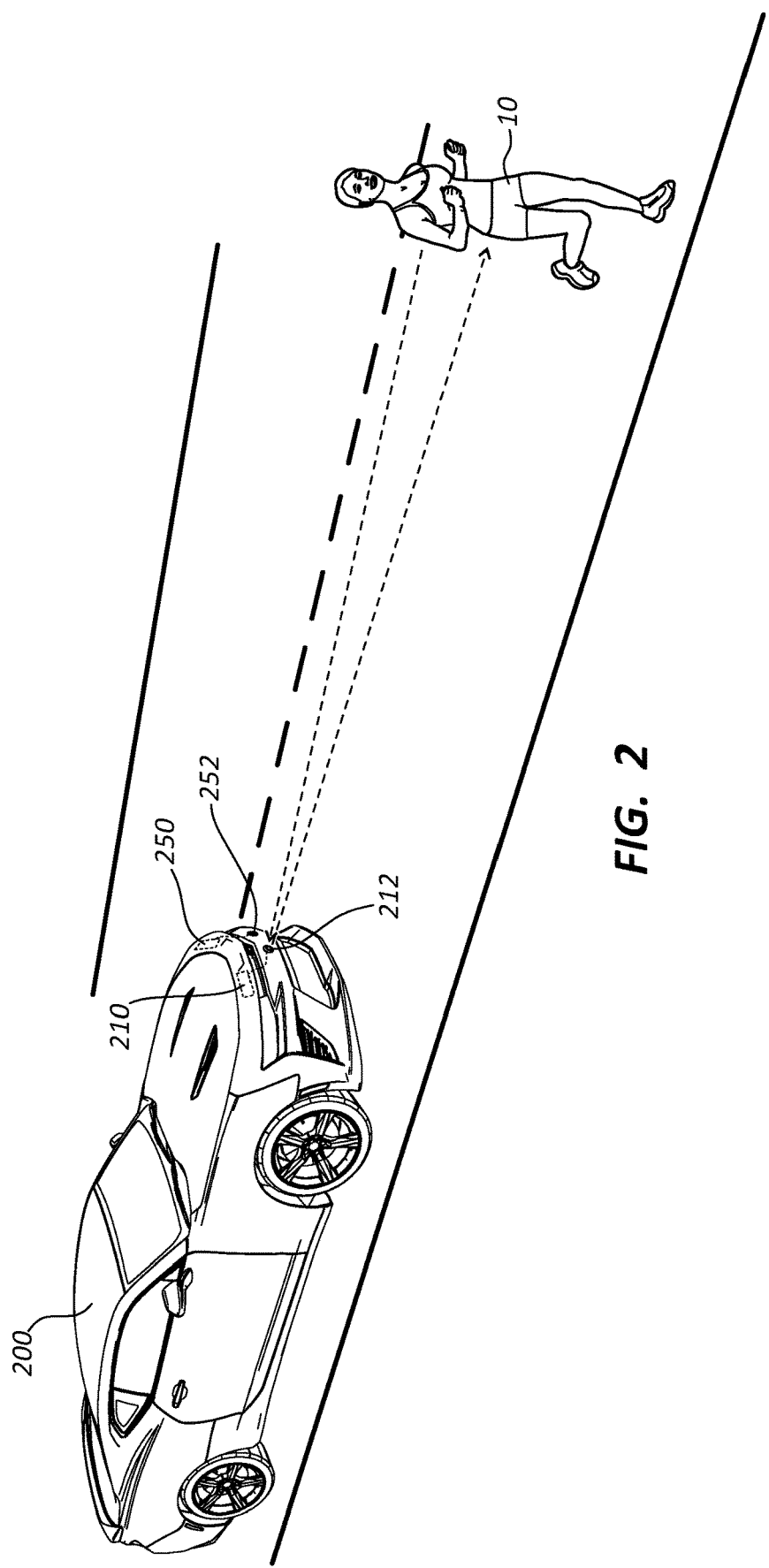
FIG. 2 depicts a vehicle having a system for remote detection of objects from within a host vehicle according to some embodiments while detecting an object.

FIG. 2 depicts a host vehicle 200 comprising a system for remote detection of objects according to some embodiments. As depicted in this figure, vehicle 200 may comprise two separate sensors and two corresponding sensor modules, as described above. Thus, a first sensor module 210 may comprise a RADAR sensor 212 and a second sensor module 250 may comprise a camera 252. Thus, as discussed above, upon detecting an object, such as a pedestrian 10, by one of RADAR sensor 212 and camera 252, the system may be configured to temporarily change one or more settings of the non-detecting sensor/module to increase the probability of the non-detecting sensor/module of detecting pedestrian 10.

Figure 3:
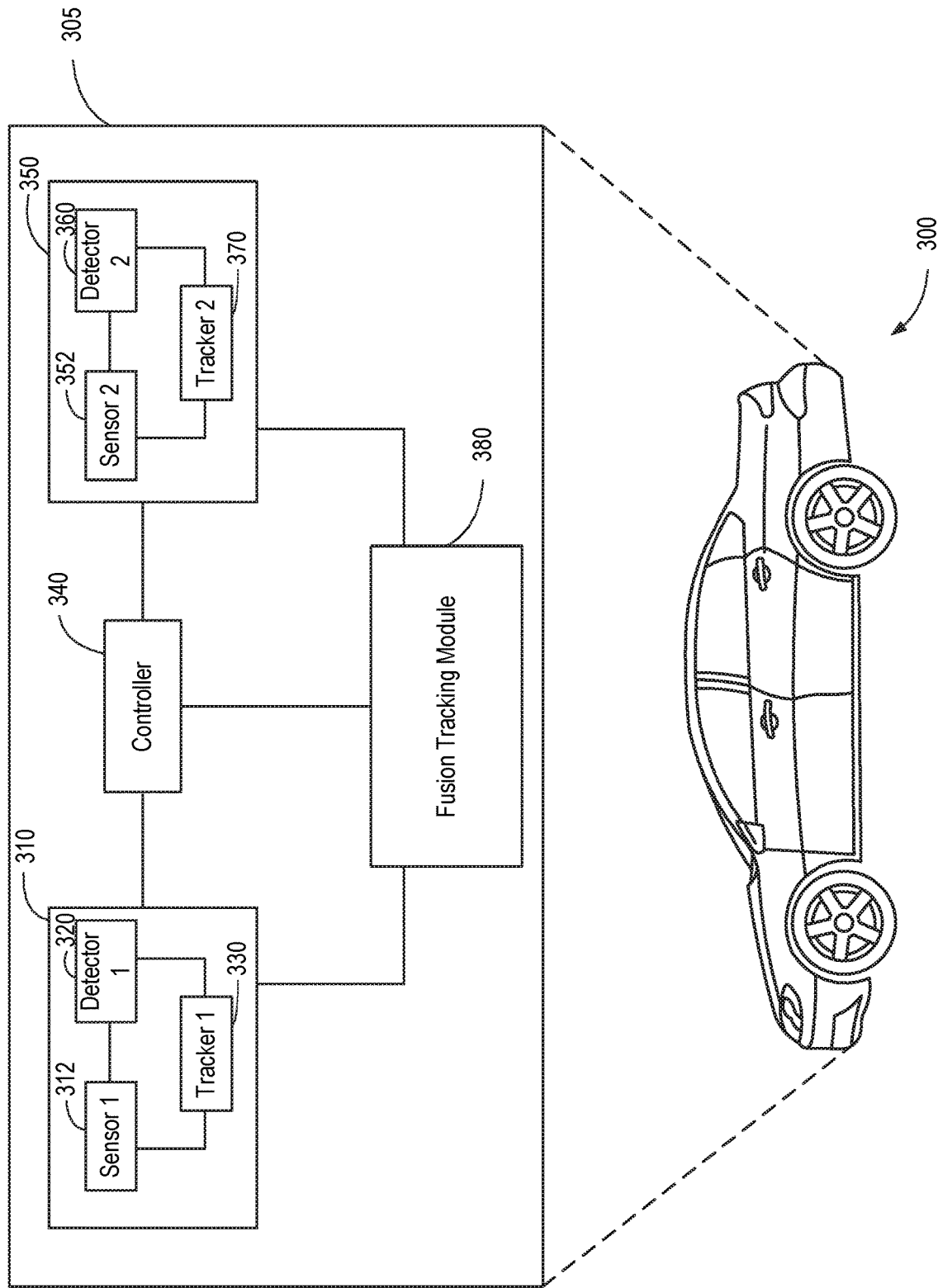
FIG. 3 depicts another vehicle having a system for remote detection of objects according to other embodiments.

FIG. 3 depicts another vehicle 300 comprising a system 305 for remote detection of objects within vehicle 300 according to some embodiments. System 310 comprises a first object sensor module 310. First object sensor module 310 comprises a first sensor 312, a detection module 320, and a tracking module 330. Similarly, system 305 comprises a second object sensor module 350 comprising a second sensor 352, a second object detection module 360, and a second tracking module 370.

Detection modules 320/360 are, respectively, configured to receive raw, sensed data from sensors 312/352 and attempt to identify/detect remote objects using such data. Similarly, tracking modules 330/370 are, respectively, configured to receive processed data from detection modules 320/360 to track remote objects identified by detection modules 320/360 using the raw data from sensors 312/352.

System 305 further comprises a controller 340, which may be configured to process data from sensors 312/352. As used herein, the term controller refers to a hardware device that includes a processor and preferably also includes a memory element. The memory may be configured to store one or more of the modules referred to herein and the controller 340 and/or processor may be configured to execute the modules to perform one or more processes described herein.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

System 305 further comprises a fusion tracking module 380, which may be configured to receive data from modules 310 and 350 and to fuse data from detected and/or tracked objects by processing this combined data. Controller 340 may be configured to process data from fusion tracking module 380. Of course, as those of ordinary skill in the art will appreciate, any suitable number of controllers and/or processors may be used as desired.

Figure 4:
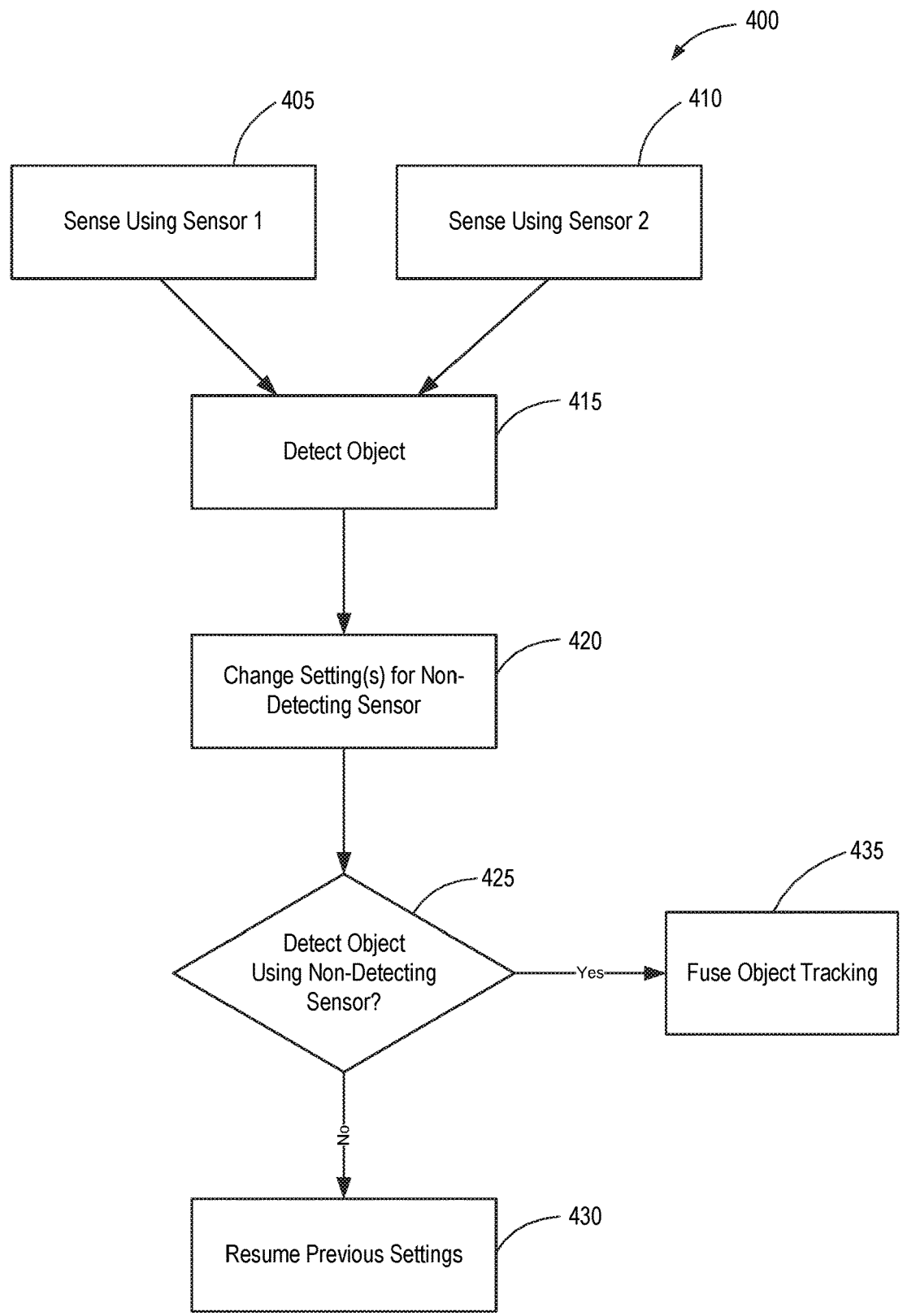
FIG. 4 is a flow chart depicting an example of a method for remote detection of objects within a host vehicle according to some implementations.

FIG. 4 is a flow chart depicting an example of a method 400 for detecting remote objects within a host vehicle according to some implementations. As shown in this figure, method 400 may begin at step 405, at which point a first set of sensed data may be generated and/or received using a first object sensor, such as a RADAR sensor, LIDAR sensor, camera, or the like. Similarly, at step 410, a second set of sensed data may be generated and/or received using a second object sensor, which second object sensor may, in some implementations, differ from the first object sensor. In some implementations, steps 405 and/or 410 may comprise receiving raw data from one or both of these sensors.

Step 415 may comprise detecting one or more objects using one or both of the object sensors. In some implementations, step 415 may be performed using, for example, a detection module, such as detection modules 120/160 or 320/360. Upon detecting an object using data from a given sensor, method 400 may then comprise changing one or more settings of the sensor and/or module associated with the non-detecting sensor at 420. Thus, for example, if the first object sensor has detected an object, step 420 may comprise changing an operational parameter and/or setting of the second object sensor or one or more modules associated with the second object sensor to increase the probability of the object also being detected by the second object sensor. In preferred embodiments and implementations, step 420 may comprise temporarily changing such a parameter and/or setting. This setting/parameter may then be reset to its original state after, for example, a predetermined time period, or after the object is no longer being detected and/or tracked.

In some implementations, step 420 may comprise changing a threshold of the non-detecting object sensor. In some such implementations, step 420 may comprise reducing at least one of a detection threshold and a tracking threshold of or otherwise associated with the non-detecting object sensor. In some such implementations, step 420 may comprise reducing at least one of a signal-to-noise ratio of the non-detecting sensor and a tracking threshold for initiating or maintaining a track of an object of the non-detecting sensor.

At step 425, a determination may be made as to whether the non-detecting sensor (the sensor that did not initially detect the object) has, within the changed settings/parameters, detected the object detected by the detecting sensor. If not, the previous settings of the non-detecting sensor and/or related module may be reinstated at 430. Of course, as previously mentioned, in some implementations, a time limit may instead be applied for maintaining the lower-threshold settings if desired. If the non-detecting sensor detects the object detected by the detecting sensor, the data from both sensors may be fused at 435 using, for example, a fusion tracking module or the like. As another alternative, in some implementations, step 425 may comprise applying a time limit for the non-detecting sensor to detect the object detected by the detecting sensor. If this time limit expires, method 400 may proceed to step 430 and the temporary setting(s) change(s) may be reset. If the object is detected within this time limit, the object detected by both sensors may be fused by a fusion tracker or the like at step 435.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for detecting remote objects from within a host vehicle, the method comprising the steps of:
   generating a first set of sensed data using a first object sensor;
   generating a second set of sensed data using a second object sensor;
   detecting an object using the sensed data from the first object sensor;
   upon detecting the object using the sensed data from the first object sensor, changing a setting associated with the second object sensor to increase a probability of detecting the object using the second set of sensed data from the second object sensor, wherein the step of changing a setting associated with the second object sensor to increase the probability of detecting the object using the second set of sensed data from the second object sensor comprises reducing at least one of a detection threshold and a tracker threshold associated with the second object sensor only within an angle range associated with the detected object to increase the probability of detecting the object using the second set of sensed data from the second object sensor.

2. The method of claim 1, wherein the first object sensor comprises an object sensor of a different type than the second object sensor.

3. The method of claim 2, wherein one of the first object sensor and the second object sensor comprises a RADAR sensor, and wherein the other of the first object sensor and the second object sensor comprises a camera.

4. The method of claim 1, wherein the step of changing a setting associated with the second object sensor to increase the probability of detecting the object using the second set of sensed data from the second object sensor comprises reducing at least one of a detection threshold of a detection module and a tracking threshold of a tracking module.

5. The method of claim 4, wherein the step of changing a setting associated with the second object sensor to increase the probability of detecting the object using the second set of sensed data from the second object sensor comprises changing at least one of a signal-to-noise ratio of the detection module and a threshold of the tracking module for initiating or maintaining a track of an object detected by the detection module.

6. The method of claim 1, further comprising, upon detecting an object using the sensed data from the second object sensor, changing a setting associated with the first object sensor to increase a probability of detecting the object using the first set of sensed data from the first object sensor.

7. A system for remote detection of objects from within a host vehicle, comprising:
   a first object sensor configured to receive a first set of sensed data;
   a second object sensor configured to receive a second set of sensed data;
   an object detection module configured to receive data from the first object sensor, wherein the object detection module is configured to use sensed data from the first object sensor and the second object sensor to identify remote objects from within the host vehicle, wherein the system for remote detection is configured to, upon detection of an object by the object detection module using the first set of sensed data from the first object sensor, change a setting associated with the second object sensor to increase a probability of the object detection module detecting the object using sensed data from the second object sensor, wherein the system for remote detection is configured to, upon detection of an object by the object detection module using the first set of sensed data from the first object sensor, reduce at least one of a detection threshold and a tracker threshold associated with the second object sensor to increase the probability of the object being detected using sensed data from the second object sensor, and wherein the system for remote detection is configured to, upon detection of an object by the object detection module using the first set of sensed data from the first object sensor, reduce at least one of the detection threshold and the tracker threshold associated with the second object sensor only within an angle range associated with the detected object.

8. The system of claim 7, wherein the object detection module is part of a first sensor module comprising the first object sensor.

9. The system of claim 8, wherein the first sensor module further comprises a first tracking module configured to receive processed data from the object detection module to track remote objects identified by the object detection module.

10. The system of claim 9, further comprising a second sensor module, wherein the second sensor module comprises the second object sensor, wherein the second sensor module further comprises a second object detection module configured to receive data from the second object sensor, wherein the second object detection module is configured to use the data from the second object sensor to identify remote objects from within the host vehicle, and wherein the second sensor module further comprises a second tracking module configured to receive processed data from the second object detection module to track remote objects identified by the second object detection module.

11. The system of claim 10, further comprising a fusion tracking module configured to receive data from both the first tracking module and the second tracking module to track objects detected by both the first tracking module and the second tracking module.

12. The system of claim 7, wherein the first object sensor comprises a camera, and wherein the second object sensor comprises a RADAR sensor.

13. The system of claim 7, wherein the system for remote detection is further configured to, upon detection of an object by the object detection module using the second set of sensed data from the second object sensor, change a setting associated with the first object sensor to increase a probability of the object detection module detecting the object using data from the first object sensor.

* * * * *